US012552490B2

(12) United States Patent
Baumgaertner et al.

(10) Patent No.: US 12,552,490 B2
(45) Date of Patent: Feb. 17, 2026

(54) METHOD AND DRIVE SYSTEM FOR ADAPTING A DRIVE ASSIST BY AN ELECTRIC DRIVE MOTOR OF AN ELECTRICALLY DRIVABLE BICYCLE

(71) Applicant: Robert Bosch GmbH, Stuttgart (DE)

(72) Inventors: Sebastian Baumgaertner, Nuertingen-Raidwangen (DE); Tobias Dominik Lipowsky, Filderstadt (DE); Merlin Martin Manewald, Reutlingen (DE); Daniel Schwenk, Dornstetten (DE); Jonathan Neudorfer, Reutlingen-Ohmenhausen (DE); Sebastian Eberle, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 242 days.

(21) Appl. No.: 17/660,474

(22) Filed: Apr. 25, 2022

(65) Prior Publication Data

US 2022/0355897 A1 Nov. 10, 2022

(30) Foreign Application Priority Data

May 5, 2021 (DE) ...................... 10 2021 204 510.3

(51) Int. Cl.
*B62M 6/50* (2010.01)
*B62J 45/411* (2020.01)

(52) U.S. Cl.
CPC .............. *B62M 6/50* (2013.01); *B62J 45/411* (2020.02)

(58) Field of Classification Search
CPC ................................ B62M 6/50; B62J 45/411
See application file for complete search history.

(56) References Cited

U.S. PATENT DOCUMENTS

| | | | |
|---|---|---|---|
| 6,446,745 B1* | 9/2002 | Lee | B62M 6/65 180/220 |
| 2018/0257740 A1* | 9/2018 | Kikkawa | B62B 5/0073 |
| 2018/0319457 A1* | 11/2018 | Santucci | B62M 6/50 |
| 2019/0241234 A1* | 8/2019 | Hattori | B62J 50/22 |
| 2019/0263472 A1* | 8/2019 | Kimpara | B62M 6/55 |
| 2019/0300105 A1* | 10/2019 | Marshall | B62J 45/412 |
| 2019/0315431 A1* | 10/2019 | Vijaya Kumar | B62M 6/45 |
| 2019/0389535 A1* | 12/2019 | Moening | B62M 6/90 |
| 2021/0394863 A1* | 12/2021 | Stahl | B62M 6/50 |

FOREIGN PATENT DOCUMENTS

DE 102017210593 B3 8/2018

* cited by examiner

*Primary Examiner* — Hussein Elchanti
(74) *Attorney, Agent, or Firm* — NORTON ROSE FULBRIGHT US LLP

(57) ABSTRACT

A method and a drive system for adapting a drive assist by an electric drive motor of an electrically drivable bicycle. The method includes: ascertaining an instantaneous rider torque exerted by a rider of the bicycle on a drive train of the bicycle, ascertaining rider torque statistics based on a plurality of rider torques ascertained over time, ascertaining an assignment rule between the rider torque statistics and a predefined target load spectrum for the bicycle, the assignment rule approximating the rider torque statistics to the target load spectrum, establishing a motor torque corresponding to the instantaneous rider torque, based on the assignment rule, and operating the electric drive by specifying the ascertained motor torque.

12 Claims, 4 Drawing Sheets

METHOD AND DRIVE SYSTEM FOR ADAPTING A DRIVE ASSIST BY AN ELECTRIC DRIVE MOTOR OF AN ELECTRICALLY DRIVABLE BICYCLE

CROSS REFERENCE

The present application claims the benefit under 35 U.S.C. § 119 of German Patent Application No. DE 10 2021 204 510.3 filed on May 5, 2021, which is expressly incorporated herein by reference in its entirety.

BACKGROUND INFORMATION

The present invention relates to a method and a drive system for adapting a drive assist by an electric drive motor of an electrically drivable bicycle.

Some conventional, electrically drivable bicycles (for example, e-bikes, pedelecs, etc.) in the related art ascertain a level of a particular drive assist by an electric drive motor, based on particular assistance factors. These assistance factors are usually predefined fixed values, and/or values that are selected, for example, as a function of a cadence (i.e., a pedaling frequency) of a rider of such bicycles. The assistance factors are generally established independently of the particular performance capability of the rider of such bicycles.

In addition, conventionally, in the related art, gears and other components of the bicycles are designed with respect to a load spectrum that must not or should not be exceeded by the loads in the field. As a result, establishing particular assistance factors in the related art takes place in such a way that the load spectrum also cannot be exceeded by high-performance riders.

SUMMARY

According to a first aspect of the present invention, a method for adapting a drive assist by an electric drive motor of an electrically drivable bicycle is provided.

In a first step of the method according to an example embodiment of the present invention, an instantaneous rider torque exerted by a rider of the bicycle on a drive train of the bicycle is ascertained. This ascertainment preferably takes place based on an evaluation unit according to the present invention which, for example, is an independent processing unit or part of an existing processing unit (for example, a control unit of the electric drive motor) of the electrically drivable bicycle. For ascertaining the instantaneous rider torque, the evaluation unit is directly or indirectly connected (via a filter, for example), using information technology, to a torque sensor of the bicycle that is situated, for example, in the bottom bracket ball bearing of the bicycle and is configured to detect an instantaneous rider torque. In this regard, it is noted that, although rider torque values detected in this way represent the basis for all subsequent method steps and advantageous embodiments of the present invention described below, it is possible in principle or also meaningful to carry out the method according to the present invention based on a variable that is derived from such torque values. In particular, rider performance that is ascertained from the torque values comes into consideration as such a derived variable, which is correspondingly usable here as an alternative or in addition to use of the rider torques. For purposes of a simplified description, the present invention is explained based on particular rider torques as a representative for the different usable variables, without thereby making a restriction to this variant.

In a second step of the method according to an example embodiment of the present invention, rider torque statistics are ascertained based on a plurality of rider torques that are ascertained over time. For this purpose, the evaluation unit is connected to a memory unit using information technology, for example, in order to store instantaneous rider torque values, detected over time, in this memory unit and to ascertain the rider torque statistics based on these stored rider torque values. It is pointed out that in the case of using a variable that is derived from the rider torques, the rider torque statistics may correspondingly be statistics concerning this derived variable (for example, statistics concerning rider performance values). The ascertaining of the statistics takes place, for example, at regular time intervals and/or whenever a predefined distance has been covered and/or whenever a predefined number of newly detected rider torque values has been stored in the memory unit.

In a third step of the method according to an example embodiment of the present invention, an assignment rule between the rider torque statistics and a predefined target load spectrum for the bicycle is ascertained, the assignment rule approximating the rider torque statistics to the target load spectrum. The target load spectrum preferably corresponds to a previously ascertained load spectrum for the bicycle or for a portion of the bicycle, in particular for the drive train of the bicycle, which represents the particular allowable loads within a service life intended for the bicycle. This target load spectrum is preferably individually ascertained and used for each type of bicycle. In addition, it is possible for the target load spectrum used here to represent not the maximum allowable loads on the bicycle over the intended service life, but, rather, loads that differ from same. In this regard, it is also possible for the target load spectrum to provide lower loads as well as higher loads (in particular temporarily limited) than the ascertained allowable load spectrum.

In a fourth step of the method according to an example embodiment of the present invention, a motor torque corresponding to the instantaneous rider torque is ascertained or established, based on the assignment rule.

In a fifth step of the method according to an example embodiment of the present invention, the electric drive motor is operated by specifying the ascertained motor torque. Specifying the motor torque subsequently results in the drive motor being activated in such a way that it provides the ascertained motor torque, which represents a target torque for the motor, to the drive train, or approximates same. For this purpose, for example a conventional motor controller or conventional motor regulator is used, which may also be an integral part of the evaluation unit. It is pointed out that the assignment between particular rider torques and particular motor torques may take place, for example, based on a function and/or an assignment table and/or assistance factors, and when assistance factors are used, the particular motor torque resulting from the product of the particular rider torque and the particular assistance factor that corresponds to the rider torque.

Taking into account, according to an example embodiment of the present invention, the rider torque statistics and the associated assignment rule between the rider torque statistics and the predefined target load spectrum offers the particular advantage according to the present invention that an optimal approximation of the load on the bicycle or the load-relevant portion of the bicycle to the target load spectrum always takes place, regardless of a particular rider performance. On the one hand, this results in a rider of below-average performance receiving, on average, a higher level of motor assistance than would be the case if fixed assistance factors, designed for a rider of average performance, for example, were used. On the other hand, this results in a rider of above-average performance receiving better graduated motor assistance over the entire rider torque range. In both cases, this generally results in better riding dynamics that are adapted to the particular rider performance, and/or in an enhanced rider experience, while a sought service life for the bicycle is not adversely affected by adhering to the target load spectrum. A further resulting advantage is that safety factors for particular components of the bicycle, which possibly are to be additionally taken into account and which may result in the load spectrum of the bicycle not being fully utilizable, may be dispensed with or at least greatly reduced in comparison.

Preferred refinements of the present invention are disclosed herein.

In one advantageous example embodiment of the present invention, the rider torque statistics are ascertained only when the instantaneous rider torque exceeds a first predefined rider torque threshold value. As a result, during time periods in which the rider of the bicycle him/herself exerts little or no torque on the drive train (for example, in the course of downhill travel), the rider torque statistics are not inadvertently changed to lower values, as the result of which the assignment of motor torques to particular rider torques no longer achieves the optimal approximation to the target load spectrum with regard to the performance capability of the particular rider. In addition, it is thus possible to advantageously reduce a processing load on the evaluation unit and/or a memory requirement during these time periods. Alternatively or additionally, it is possible to use standard rider torque statistics or rider torque statistics ascertained from the usage history of the bicycle as rider torque statistics, provided that in a present utilization period of the bicycle, a minimum number of rider torques necessary for ascertaining the rider torque statistics is not yet present, and/or an idle period of the bicycle exceeds a predefined first time period and/or a change of riders has been ascertained. A new utilization period is established, for example, when a change of riders has taken place and/or the present utilization preceded a predefined idle period and/or a reversal of direction on a present route has been ascertained. A change of riders may be ascertained, for example, by comparing a present utilization of the bicycle to a stored usage history. For this purpose, it is possible, among other things, to compare instantaneous riding dynamics (for example, a typical acceleration and/or braking behavior) of the rider to stored values from the past. In the event of a predefined minimum deviation between instantaneous values and the values from the past, a change of riders may accordingly be identified. Alternatively or additionally, a change of riders may be ascertained based on a user input, made by a rider at the time, at the bicycle and/or by an assignment of a particular rider to automatically identifiable mobile terminals (for example, smart phones, smart watches, fitness trackers, etc.), which are connected in a wireless and/or wired manner to the evaluation unit, using information technology.

The rider torque statistics are preferably computed as an arithmetic average value or as a sliding average value over a certain number of ascertained rider torques. In addition, it is possible to use statistics that differ from same, for example based on a median value, etc. The number of rider torques included in the computation is advantageously established as a function of a presently ascertained rider torque and/or of a position of the bicycle and/or of a route and/or of a minimum speed of the bicycle and/or of a distance covered (for example, to eliminate undesirable influences of frequent start/stop operations), and/or of a second predefined time period (which is defined, for example, as a present utilization period or as a fixed time window).

At least the step of operating the electric drive motor is advantageously carried out by specifying the ascertained motor torque only when the instantaneous rider torque exceeds the first rider torque threshold value, so that a processing load on the evaluation unit and/or an instantaneous memory requirement may be reduced in this way. Alternatively or additionally, with the aid of the assignment rule it is ensured that the target load spectrum is not exceeded. In particular for the case in which the target load spectrum represents a maximum allowable load spectrum for the bicycle, it is thus ensured that a service life intended for the bicycle is achievable.

The target load spectrum and/or the assignment rule between the rider torque statistics and the target load spectrum are/is preferably adapted as a function of a rider cadence and/or of a rider cadence profile (i.e., a change in the rider cadence over time) and/or of an ambient temperature and/or of a temperature of one or multiple components of the drive train of the bicycle (for example, of the motor and/or a rechargeable battery) and/or of a rider identification and/or of a position of the bicycle and/or of a route and/or of a route plan and/or of an age and/or of a cumulative operating period of the bicycle and/or of a selected riding mode for the bicycle (for example, a comfort mode, a sport mode, an emergency operating mode, etc.). It is thus generally possible to optimally adapt in each case particular loads that act on the bicycle or on certain components of the bicycle as a function of the above-mentioned and further boundary conditions. Thus, for example, for continually high ambient temperatures it may be meaningful to use a target load spectrum having a certain safety margin from the maximum allowable load spectrum for the bicycle, so that the components of the bicycle are not prematurely aged and/or damaged due to the continually high thermal load. In addition, it is possible, for example, as a function of a route profile that includes great fluctuations in elevation, to select a target load spectrum or an assignment rule for the bicycle that at least temporarily allows a higher level of motor assistance than would be provided for the maximum allowable load spectrum for the bicycle, in order to enable easier traveling of such a route profile.

In a further advantageous example embodiment of the present invention, the ascertaining of the assignment rule between the rider torque statistics and the target load spectrum takes place based on the following steps: ascertaining a first histogram that represents the rider torque statistics in the form of a distribution density of rider torques that have been ascertained over time, and assigning an unassigned class (also referred to as a "bin") or multiple neighboring unassigned classes of a second histogram, which represent(s) the target load spectrum in the form of a distribution density of maximum motor torques that are to be used (or that are allowable), with an unassigned class or multiple unassigned neighboring classes of the first histogram until all classes of the first histogram are assigned. It may thus be ensured that particular motor torques are not used more frequently than allowed by the target load spectrum, as the result of which a sought service life of the bicycle is accordingly achievable. In addition, the particular rider torques are preferably assigned in each case, as a function of the frequency of their occurrence, with maximum possible or allowable motor torques, so that a high level of riding dynamics is achievable.

The assignment of particular classes of the second histogram to particular classes of the first histogram advantageously takes place in sequence, starting with those classes of the two histograms that represent the highest torques in each case, to those classes of the two histograms that represent the lowest torques in each case. In addition, it is possible to advantageously use assignment sequences that differ from same. Alternatively or additionally, the two histograms each have a uniform normalization. For example, the normalization in each case takes place in such a way that all values represented by the classes of the particular histograms result in a total value of 100% in each case.

It is particularly preferred that for each assignment within the assignment rule, a) a sum of values of classes of the first histogram involved in the particular assignment does not exceed a sum of values of classes of the second histogram involved in the particular assignment, b) the number of classes of the second histogram involved in the particular assignment corresponds to the minimum number of classes necessary to fulfill a), and c) the number of classes of the first histogram involved in the particular assignment corresponds to the maximum possible number for fulfilling a). In addition, for a case in which two or more classes of the second histogram are assigned to an individual class of the first histogram, the value of that class from the second histogram that represents the lowest torque is selected as the motor torque that corresponds to the instantaneous rider torque. This ensures that the target load spectrum may always be adhered to.

In a further advantageous example embodiment of the present invention, the assignment rule is formed by a function that is defined in segments, and that includes a first segment in which rider torques that do not exceed an average rider torque are mapped onto corresponding motor torques, the average rider torque being mapped onto an average motor torque. In addition, the function includes a second segment in which rider torques that exceed the average rider torque are mapped onto corresponding motor torques, a maximum rider torque being mapped onto a maximum motor torque. The average motor torque and the maximum motor torque are ascertained based on the target load spectrum of the bicycle. The maximum rider torque is the highest rider torque that is ascertained within a third predefined time period or within a predefined distance. In addition, the first segment of the function and/or the second segment of the function are/is formed in each case by a linear term and/or a nonlinear term. For example, the function in both segments is defined by a straight line segment. Furthermore, the function includes a continuous transition between the first segment and the second segment.

It is particularly advantageous for the particular motor torque to be additionally ascertained as a function of an assistance factor that is preferably established based on a rider preference (for example, with the aid of a user input at an onboard computer of the bicycle), and which in particular is preferably in a value range of $0<u\leq4$. It is also advantageous for the particular motor torque to be additionally ascertained as a function of a first correction factor that influences the first segment of the function and that is preferably used to adapt riding dynamics, and/or to be ascertained as a function of a second correction factor that influences the segment of the function and that is preferably used to adhere to the target load spectrum. For this purpose, the particular correction factors preferably reflect a long-term behavior of the particular rider, which is ascertained, for example, based on a long-term average value or a long-term rider histogram, in which in each case a larger number of rider torques may be included than in the above-described computation of the rider torque statistics.

According to a second aspect of the present invention, a drive system for an electrically drivable bicycle is provided. In accordance with an example embodiment of the present invention, the drive system includes: an electric drive motor, a torque sensor, and an evaluation unit. The evaluation unit is configured to ascertain with the aid of the torque sensor an instantaneous rider torque exerted by a rider of the bicycle on a drive train of the bicycle, to ascertain rider torque statistics based on a plurality of rider torques ascertained over time, and to ascertain an assignment rule between the rider torque statistics and a predefined target load spectrum for the bicycle, the assignment rule approximating the rider torque statistics to the target load spectrum in order to establish a motor torque, corresponding to the instantaneous rider torque, based on the assignment rule and to operate the electric drive motor by specifying the ascertained motor torque.

The evaluation unit of the drive system is also preferably configured to carry out one or multiple method(s) according to the above description. The features, feature combinations, and advantages resulting therefrom clearly correspond to those in conjunction with the first-mentioned aspect of the present invention, so that reference is made to the above discussion in order to avoid repetitions.

BRIEF DESCRIPTION OF THE DRAWINGS

Exemplary embodiments of the present invention are described in greater detail below with reference to the figures.

DETAILED DESCRIPTION OF EXAMPLE EMBODIMENTS

Figure 1:
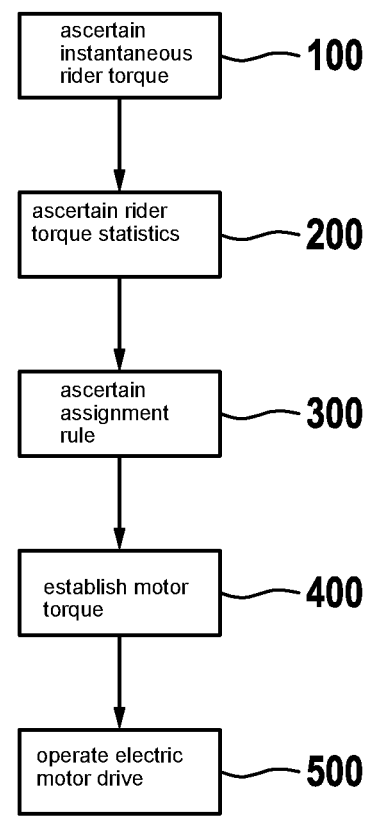
FIG. 1 shows a flowchart that illustrates steps of a method according to an example embodiment of the present invention.

FIG. 1 shows a flowchart that illustrates steps of a method according to the present invention for adapting a drive assist by an electric drive motor 10 of an electrically drivable bicycle.

In step 100 of the method according to the present invention, with the aid of a torque sensor 20 an instantaneous rider torque $M_{rider}$ exerted by a rider of the bicycle on a drive train of the bicycle is ascertained by an evaluation unit 30, which in the present case is a microcontroller of the drive train of the bicycle. The ascertaining takes place cyclically at a predefined frequency of 10 Hz. For subsequent processing, rider torques $M_{rider}$ cyclically ascertained in this way are stored as data, which represent these torques, in a memory unit that is connected to evaluation unit 30, using information technology.

Rider torque statistics are ascertained in step 200 based on the plurality of rider torques $M_{rider}$ ascertained over time. The rider torque statistics are cyclically ascertained here at a frequency of 10 Hz, and represent an arithmetic average value over all stored rider torques that have been ascertained within a present utilization period of the bicycle and that are above a first predefined rider torque threshold value of 1 Nm. A new utilization period begins here, for example, after an idle period of the bicycle of 2 h or when a change of riders is recognized, the change of riders being automatically ascertained based on distinguishable rider cadence profiles.

An assignment rule between the rider torque statistics and a predefined target load spectrum is ascertained for the bicycle in step 300, the assignment rule approximating the rider torque statistics to the target load spectrum. The assignment rule is ascertained according to the described steps. In addition, the assignment rule is cyclically ascertained at a frequency of 10 Hz.

A motor torque $M_{motor}$ corresponding to instantaneous rider torque $M_{rider}$ is established in step 400, based on the assignment rule, if instantaneous rider torque $M_{rider}$ exceeds the first rider torque threshold value. For the case in which the first rider torque threshold value is not exceeded by instantaneous rider torque $M_{rider}$, motor torque $M_{motor}$ is ascertained based on a predefined fixed assistance factor of 2 by multiplying this assistance factor by instantaneous rider torque $M_{rider}$.

In step 500, by specifying ascertained motor torque $M_{motor}$, electric drive motor 10 is operated in such a way that a control unit for electric drive motor 10 makes an adjustment to predefined motor torque $M_{motor}$.

Figure 2:
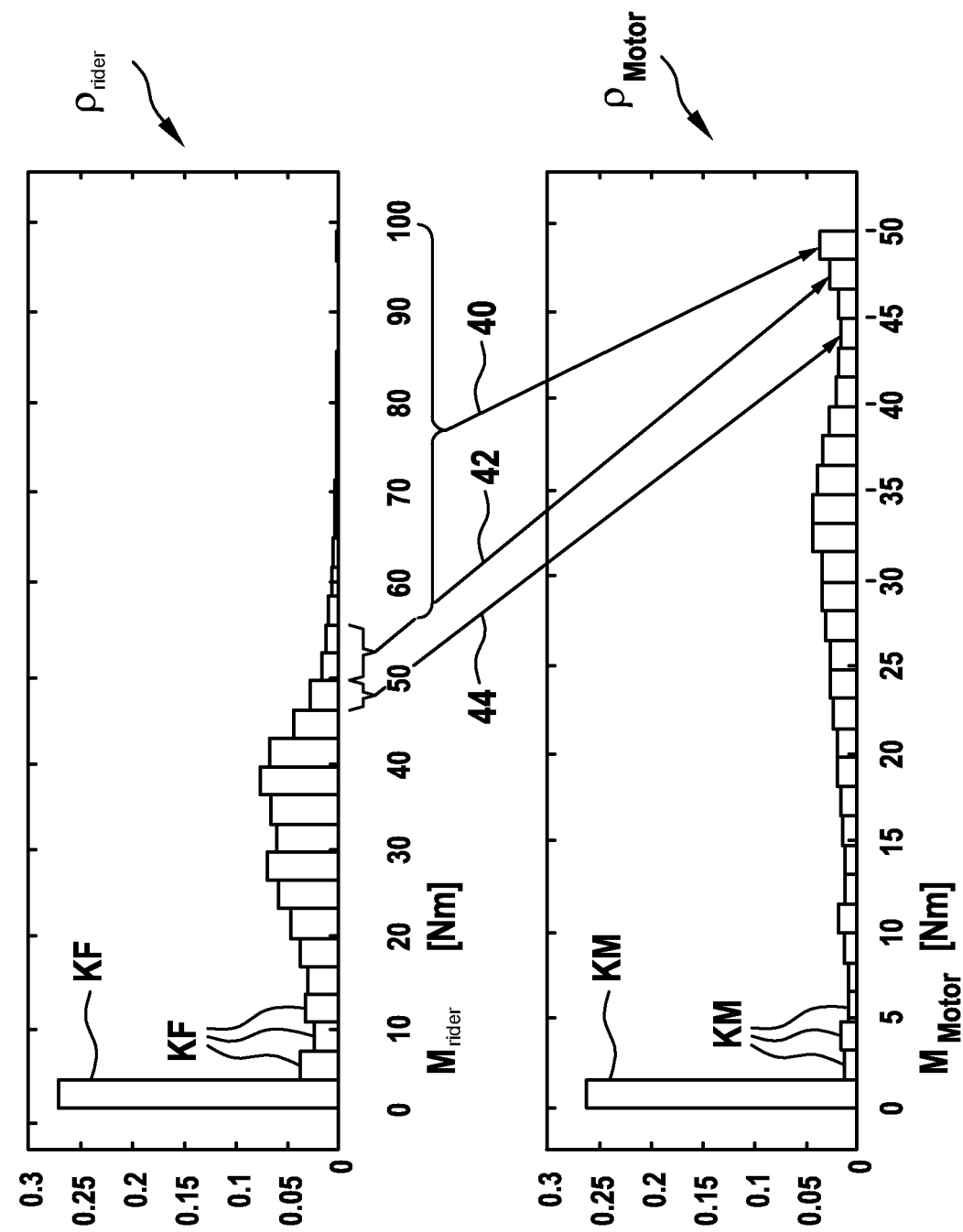
FIG. 2 shows an example of a distribution density of rider torques and motor torques, and an example of an assignment of their respective classes.

FIG. 2 shows an example of a distribution density of rider torques $M_{rider}$ and motor torques $M_{motor}$, and an example of the assignment of their respective classes KF, KM. The top histogram in FIG. 2 represents the distribution density of rider torques $\rho_{rider}$ over a certain time period. Particular classes KF of this histogram are only partly provided with reference symbols for reasons of clarity. The bottom histogram in FIG. 2 represents the distribution density of motor torques $\rho_{motor}$, which represents a previously ascertained maximum allowable load spectrum for the drive train of the bicycle. Particular classes KM of this histogram are likewise only partly provided with reference symbols for reasons of clarity. As an example, three assignments 40, 42, 44 between the two histograms, which result according to the steps described herein, are illustrated.

Figure 3:
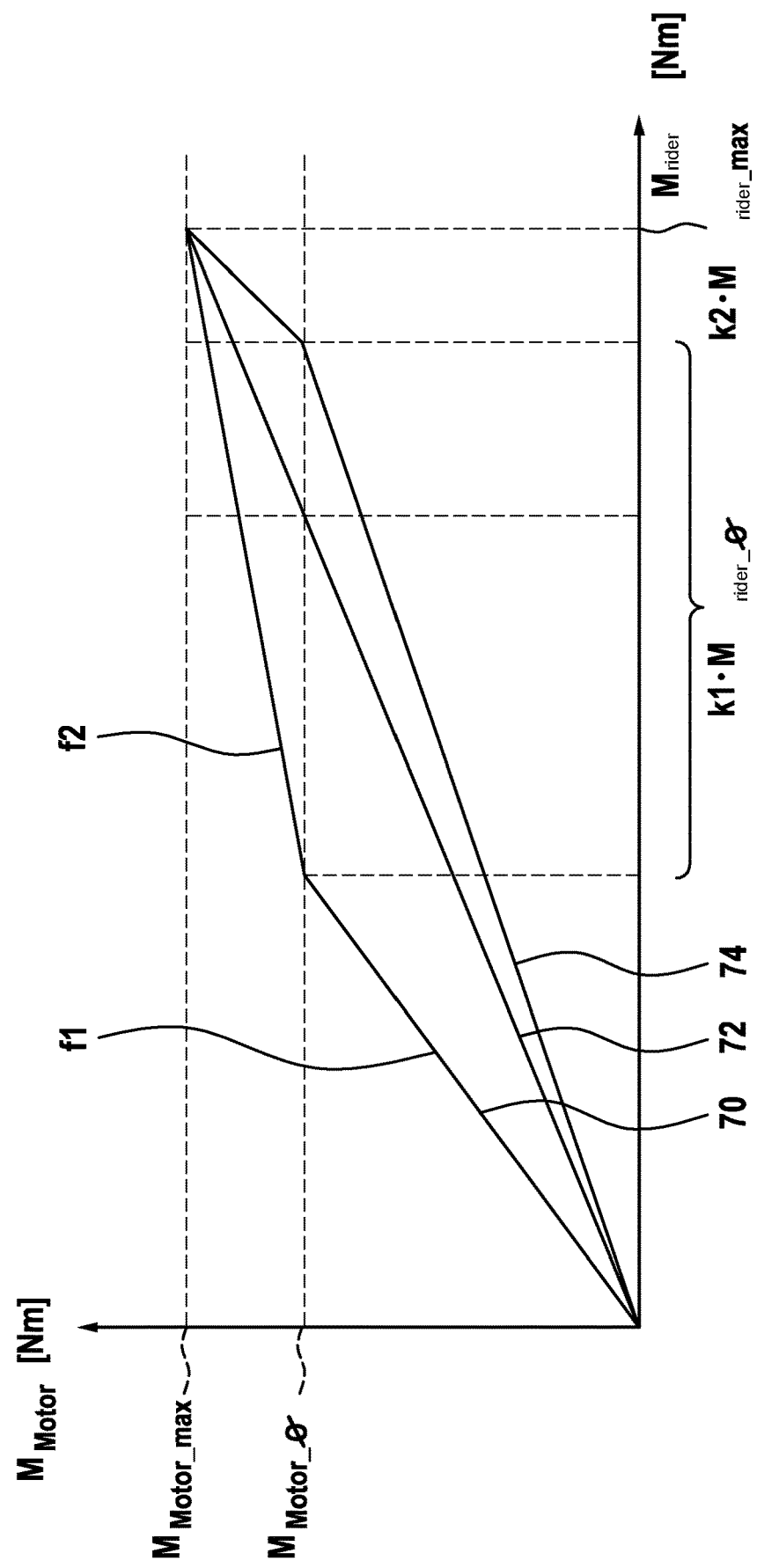
FIG. 3 shows examples of assignment functions between rider torques and corresponding motor torques for riders with different performance capabilities.

FIG. 3 shows an example of assignment functions 70, 72, 74, defined in segments, between rider torques $M_{rider}$ and corresponding motor torques $M_{motor}$ for riders with different performance capabilities. First assignment function 70 represents a rider of below-average performance, second assignment function 72 represents a rider of average performance, and third assignment function 74 represents a rider of above-average performance. The particular straight line segments leading out from the origin represent respective first segments f1 of assignment functions 70, 72, 74, and are established in such a way that in each case they connect the origin to the particular intersection point of a rider-specific average rider torque $M_{rider\_\varnothing}$, which in each case has been multiplied by a rider-specific first correction factor k1, and predefined allowable average motor torque $M_{motor\_\varnothing}$.

Proceeding from these particular intersection points of average torques $M_{rider\_\varnothing}$, $M_{motor\_\varnothing}$, the continuing straight line segments of the particular assignment functions, which represent respective second segments f2 of assignment functions 70, 72, 74, are selected in such a way that they connect the particular intersection points from average torques $M_{rider\_\varnothing}$, $M_{motor\_\varnothing}$ and an intersection point of particular corresponding maximum rider torque $M_{rider\_max}$, which in each case has been multiplied by a rider-specific second correction factor k2, and a predefined maximum allowable motor torque $M_{motor\_max}$. Particular average rider torques $M_{rider\_\varnothing}$ are ascertained based on a sliding average value of detected rider torques $M_{rider}$, the sliding average value being computed in each case over those rider torques $M_{rider}$ that have been detected within a previous time period of 300 s. Particular maximum rider torque $M_{rider\_max}$ is ascertained in each case from those rider torques $M_{rider}$ that have been detected in a previous time period of 300 s.

First correction factor k1 is preferably used to increase or decrease riding dynamics, and second correction factor k2 is preferably used to reliably adhere to the target load spectrum.

Figure 4:
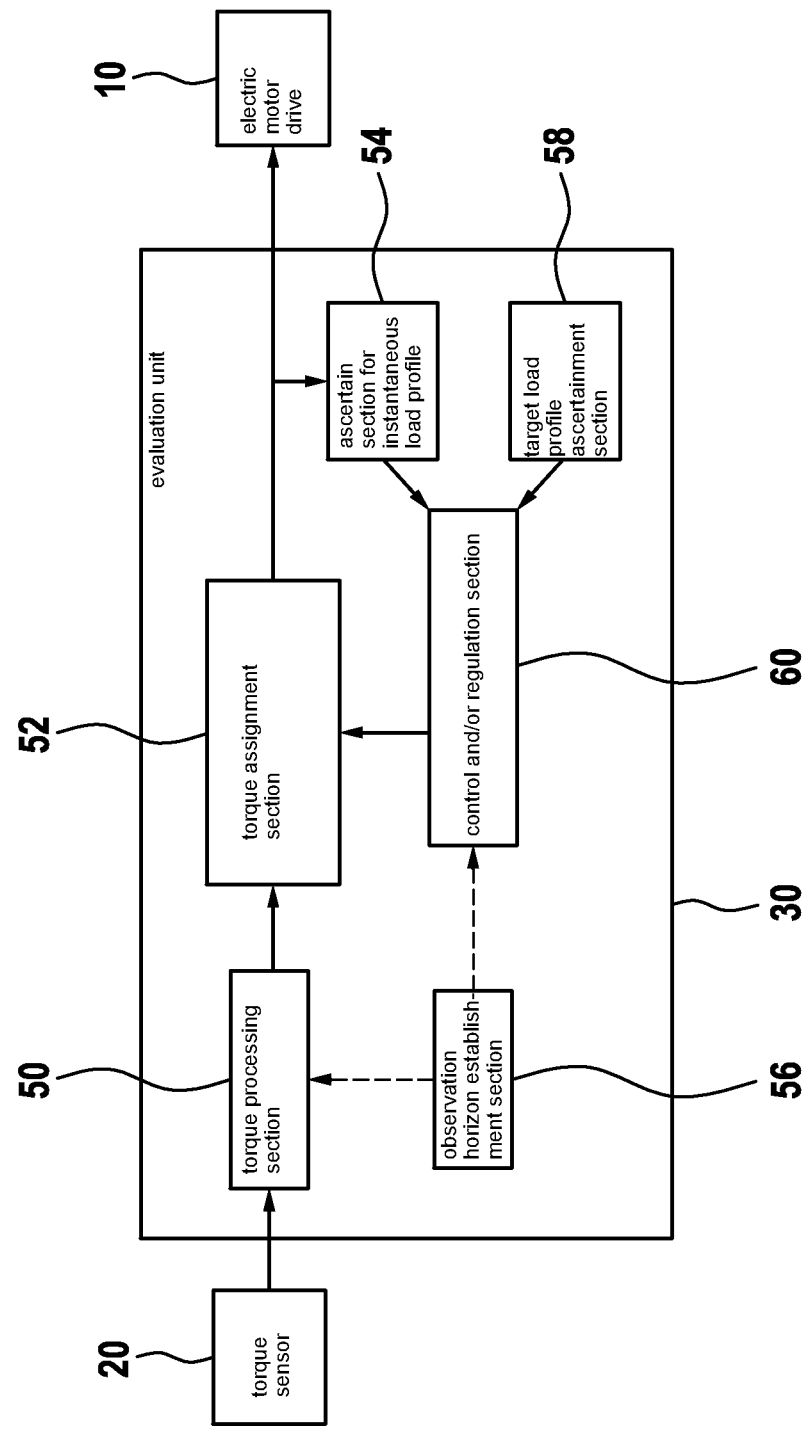
FIG. 4 shows a schematic overview of components of a drive system according to an example embodiment of the present invention for an electrically drivable bicycle.

FIG. 4 shows a schematic overview of components of a drive system according to the present invention for an electrically drivable bicycle. The drive system includes a torque sensor 20 that is configured to detect a rider torque $M_{rider}$ and transfer a piece of information concerning same to an evaluation unit 30 according to the present invention. Evaluation unit 30, which in the present case is a microcontroller, includes a plurality of processing sections, which are designed here in each case as computer program sections. With the aid of a torque processing section 50, evaluation unit 30 is configured to compute rider torque statistics, in the form of average rider torques $M_{rider\_\varnothing}$ and maximum rider torques $M_{rider\_max}$, from rider torque values $M_{rider}$ that are received from torque sensor 20. With the aid of a motor torque ascertainment section 52, which is based on an assignment rule between the rider torque statistics and a predefined target load spectrum for the bicycle, evaluation unit 30 is configured to assign a corresponding motor torque $M_{motor}$ to each rider torque $M_{rider}$ present at the time, and to operate an electric drive motor 10 of the bicycle by specifying this motor torque $M_{motor}$. With the aid of an ascertainment section for instantaneous load profile 54, evaluation unit 30 is configured to ascertain an actually present load profile for the drive train of the bicycle. In conjunction with a target load profile ascertainment section 58, in which a target load profile or target load spectrum for the bicycle is stored, a control and/or regulation section 60 of evaluation unit 30 is configured to address motor torque ascertainment section 52 in such a way that a control with regard to the target load profile takes place. This may occur based on previous and/or predicted rider torques $M_{rider}$. With the aid of an observation horizon establishment section 56, evaluation unit 30 is also configured to establish, based on time and/or based on route, a particular number of rider torque values $M_{rider}$ to be considered, as a function of further boundary conditions such as an instantaneous route profile and/or an instantaneous position of the bicycle, etc. It is pointed out that this establishment for the particular components that use this observation horizon may be different.

What is claimed is:

1. A method for adapting a drive assist by an electric drive motor of an electrically drivable bicycle, comprising the following steps:
   ascertaining an instantaneous rider torque exerted by a rider of the bicycle on a drive train of the bicycle;
   ascertaining rider torque statistics based on a plurality of rider torques ascertained over time;
   ascertaining an assignment rule between the rider torque statistics and a predefined target load spectrum for the bicycle, the assignment rule approximating the rider torque statistics to the target load spectrum;

ascertaining a motor torque corresponding to the instantaneous rider torque, based on the assignment rule; and
operating the electric drive motor by specifying the ascertained motor torque,
wherein the ascertaining of the assignment rule includes ascertaining a histogram that represents the rider torque statistics in a form of a distribution density of the plurality of rider torques ascertained over time.

2. The method as recited in claim 1, wherein:
the rider torque statistics are ascertained based on the plurality of rider torques, the rider torque statistics are ascertained only from rider torques that exceed a first predefined rider torque threshold value; and/or
standard rider torque statistics or rider torque statistics ascertained from a usage history of the bicycle are used as rider torque statistics, provided that in a present utilization period of the bicycle:
a minimum number of rider torques necessary for ascertaining the rider torque statistics is not yet present, and/or
an idle period of the bicycle exceeds a predefined first time period, and/or
a change of riders has been ascertained.

3. The method as recited in claim 1, wherein:
the rider torque statistics are computed as an arithmetic average value or as a sliding average value over a number of ascertained rider torques; and
the number of rider torques included in the computation is established as a function of:
a presently ascertained rider torque, and/or
a position of the bicycle, and/or
a route, and/or
a minimum speed, and/or
a distance covered, and/or
a second predefined time period.

4. The method as recited in claim 1, wherein:
at least the step of operating the electric drive motor is carried out by specifying the ascertained motor torque only from rider torques that exceed the first rider torque threshold value; and/or
using the assignment rule, it is ensured that the target load spectrum is not exceeded.

5. The method as recited in claim 1, wherein the target load spectrum and/or the assignment rule between the rider torque statistics and the target load spectrum is adapted as a function of:
a rider cadence and/or a rider cadence profile, and/or
an ambient temperature, and/or
a temperature of one or multiple component(s) of the drive train of the bicycle, and/or
a rider identification, and/or
a position of the bicycle, and/or
a route and/or a route plan, and/or
an age and/or a cumulative operating period of the bicycle, and/or
a selected riding mode for the bicycle.

6. A method for adapting a drive assist by an electric drive motor of an electrically drivable bicycle, comprising the following steps:
ascertaining an instantaneous rider torque exerted by a rider of the bicycle on a drive train of the bicycle;
ascertaining rider torque statistics based on a plurality of rider torques ascertained over time;
ascertaining an assignment rule between the rider torque statistics and a predefined target load spectrum for the bicycle, the assignment rule approximating the rider torque statistics to the target load spectrum;
ascertaining a motor torque corresponding to the instantaneous rider torque, based on the assignment rule; and
operating the electric drive motor by specifying the ascertained motor torque,
wherein the ascertaining of the assignment rule between the rider torque statistics and the target load spectrum takes place based on the following steps:
ascertaining a first histogram that represents the rider torque statistics in the form of a distribution density of rider torques that have been ascertained over time; and
assigning an unassigned class or multiple neighboring unassigned classes of a second histogram, which represents the target load spectrum in the form of a distribution density of maximum motor torques that are to be used, to an unassigned class or multiple unassigned neighboring classes of the first histogram until all classes of the first histogram are assigned.

7. The method as recited in claim 6, wherein:
the assignment of particular classes of the second histogram with particular classes of the first histogram takes place in sequence, starting with those classes of the first and second histograms that represent highest torques in each case, to those classes of the first and second histograms that represent lowest torques in each case, and/or
the first and second histograms each have a uniform normalization.

8. The method as recited in claim 6, wherein:
for each assignment within the assignment rule,
a) a sum of values of classes of the first histogram involved in the assignment does not exceed a sum of values of classes of the second histogram involved in the assignment,
b) a number of classes of the second histogram involved in the assignment corresponds to a minimum number of classes necessary to fulfill a),
c) a number of classes of the first histogram involved in the assignment corresponds to the maximum possible number for fulfilling a); and
for a case in which two or more classes of the second histogram are assigned to an individual class of the first histogram, a value of that class from the second histogram that represents a lowest torque is selected as the motor torque that corresponds to the instantaneous rider torque.

9. A method for adapting a drive assist by an electric drive motor of an electrically drivable bicycle, comprising the following steps:
ascertaining an instantaneous rider torque exerted by a rider of the bicycle on a drive train of the bicycle;
ascertaining rider torque statistics based on a plurality of rider torques ascertained over time;
ascertaining an assignment rule between the rider torque statistics and a predefined target load spectrum for the bicycle, the assignment rule approximating the rider torque statistics to the target load spectrum;
ascertaining a motor torque corresponding to the instantaneous rider torque, based on the assignment rule; and
operating the electric drive motor by specifying the ascertained motor torque, wherein:
the assignment rule is formed by a function that is defined in segments, and that
includes a first segment in which rider torques that do not exceed an average rider torque are mapped onto corresponding motor torques, the average rider torque being mapped onto an average motor torque, includes a second segment in which rider torques that exceed the average rider torque are mapped onto corresponding motor torques, a maximum rider torque being mapped onto a maximum motor torque, the average motor torque and the maximum motor torque are ascertained based on the target load spectrum of the bicycle, the maximum rider torque is a highest rider torque that is ascertained within a third predefined time period or within a predefined distance, a first segment of the function and/or a second segment of the function is formed in each case by a linear term and/or a nonlinear term, and the function includes a continuous transition between the first segment and the second segment.

10. The method as recited in claim 9, wherein the motor torque is additionally ascertained as a function of:

an assistance factor that is established based on a rider preference and that is in a value range of $0 < u \leq 4$, and/or a first correction factor that influences the first segment of the function and that is used to adapt riding dynamics, and/or a second correction factor that influences the second segment of the function and that is used to adhere to the target load spectrum.

11. A drive system for an electrically drivable bicycle, comprising:

an electric drive motor;

a torque sensor; and an evaluation unit configured to:

ascertain, using the torque sensor, an instantaneous rider torque exerted by a rider of the bicycle on a drive train of the bicycle, ascertain rider torque statistics based on a plurality of rider torques ascertained over time, ascertain an assignment rule between the rider torque statistics and a predefined target load spectrum for the bicycle, the assignment rule approximating the rider torque statistics to the target load spectrum, ascertain a motor torque, corresponding to the instantaneous rider torque, based on the assignment rule, and operate the electric drive motor by specifying the ascertained motor torque, wherein the ascertaining of the assignment rule includes ascertaining a histogram that represents the rider torque statistics in a form of a distribution density of the plurality of rider torques ascertained over time.

12. The drive system as recited in claim 11, wherein:

the rider torque statistics are ascertained only from rider torques that exceed a first predefined rider torque threshold value; and/or standard rider torque statistics or rider torque statistics ascertained from a usage history of the bicycle are used as rider torque statistics, provided that in a present utilization period of the bicycle:

a minimum number of rider torques necessary for ascertaining the rider torque statistics is not yet present, and/or an idle period of the bicycle exceeds a predefined first time period, and/or a change of riders has been ascertained.

\* \* \* \* \*